(12) United States Patent
Fukushima et al.

(10) Patent No.: US 6,576,850 B2
(45) Date of Patent: Jun. 10, 2003

(54) DEVICE AND METHOD FOR DETECTING ROTATION ANGLE

(75) Inventors: Yasuyuki Fukushima, Goka-machi (JP); Masaki Niwa, Kashiwa (JP)

(73) Assignee: Wacom Co., Ltd., Saitama-ken (JP)

( * ) Notice: Subject to any disclaimer, the term of this patent is extended or adjusted under 35 U.S.C. 154(b) by 229 days.

(21) Appl. No.: 09/775,669

(22) Filed: Feb. 5, 2001

(65) Prior Publication Data

US 2001/0050556 A1 Dec. 13, 2001

(30) Foreign Application Priority Data

Mar. 9, 2000 (JP) .................................. 2000-064320

(51) Int. Cl.[7] .............................................. G08C 21/00
(52) U.S. Cl. .................................................. 178/19.03
(58) Field of Search ................................ 345/156, 173, 345/174; 178/19.03, 19.01, 18.17, 18.01; 439/13, 18–20, 22, 11; 369/136, 138, 141, 142

(56) References Cited

U.S. PATENT DOCUMENTS 4,061,381 A * 12/1977 Smal ............................ 439/22
4,597,071 A * 6/1986 Ito et al. ...................... 369/136
6,314,800 B1 * 11/2001 Nishimura ..................... 73/105

FOREIGN PATENT DOCUMENTS

| JP | 08-030374 | * | 2/1996 |
| JP | 08-286810 | * | 11/1996 |

* cited by examiner

Primary Examiner—Chanh Nguyen
(74) Attorney, Agent, or Firm—Finnegan, Henderson, Farabow, Garrett, Dunner, L.L.P.

(57) ABSTRACT

A device for detecting a rotation angle is provided. The device include a first coil, a second coil, and a twist prevention mechanism. The first coil detects a coordinate value. The second coil detects the rotation angle. The second coil includes signal lines extending therefrom. The second coil is rotatable around a center of the first coil without rotating the first coil. The twist prevention mechanism prevents the signal lines from twisting. The device is preferably included in a pack-shaped pointer that operates on a tablet. The pointer and tablet preferably utilize an electromagnetic induction principle to detect the coordinate value and the rotation angle.

29 Claims, 5 Drawing Sheets

DEVICE AND METHOD FOR DETECTING ROTATION ANGLE

BACKGROUND OF THE INVENTION

This invention generally relates to devices and methods for detecting a rotation angle. More particularly, the present invention relates to a combined coil and a pointer utilizing the combined coil for detecting a rotation angle and a related method.

A conventional device for detecting a rotation angle may be exemplified by a combined coil disclosed in Japanese laid-open patent publications Nos. 8-30374 and 8-286810. The inventors of these patent publications belong to the same company as the inventors of the present invention. The conventional combined coil will be briefly explained below.

As shown in FIG. 2, a conventional combined coil 95 includes two magnetic cores 93 and 94 arranged side by side. A coordinate detection coil 90 is wound around both magnetic cores 93 and 94 while a control coil 91 is wound around only magnetic core 93. Control coil 91 encircles part of the magnetic flux generated by coordinate detection coil 90. Thus, a rotation angle can be detected by switch-controlling control coil 91 and changing the distribution of the magnetic flux that pass through coordinate detection coil 90.

This conventional combined coil is a solid construction where both control coil 91 and coordinate detection coil 90 must be rotated simultaneously for control coil 91 to assume different rotation angles. In other words, control coil 91 alone cannot be rotated around a center of coordinate detection coil 90 without rotating coordinate detection coil 90.

The conventional combined coil of solid construction is suitable for a pen-shaped pointer, such as an electric pen or a stylus pen, because it can be easily loaded within a narrow outer housing. A tip of the electric pen, located on the line extending from the center axis of coordinate detection coil 90, contacts a tablet surface to indicate the coordinate value. An operator may then utilize the tip as an axis of rotation. Thus, it is easy for the operator to rotate the whole electric pen about the tip so that the control coil assumes different rotation angles around the center of the coordinate detection coil.

On the other hand, a pack-shaped pointer, such as a cursor, a cordless mouse or the like (hereinafter referred as a cursor), contains a relatively wide outer housing. Therefore, it does not have to utilize the conventional solid construction. Furthermore, a pack-shaped pointer does not have a structure like the tip of the electric pen that contacts the tablet surface to indicate the coordinate value. Consequently, it is not easy for an operator to rotate the whole pack-shaped pointer around a certain coordinate.

Therefore, it is desirable to rotate a combined coil without rotating the whole pack-shaped pointer that contains the combine coil. However, a pack-shaped pointer provided with a mechanism to rotate the combined coil creates a new problem to solve. Because the signal lines from the coordinate detection coil as well as those from the control coil should be connected to a circuit that is fixed within the pointer, a structure and a related method are needed to prevent the signal lines from twisting. Otherwise, the signal lines may eventually disconnect from the circuit or a rotation angle will be limited to a narrow range to avoid the disconnection.

SUMMARY OF THE INVENTION

Accordingly, the present invention is directed to a combined coil and a pointer utilizing the combined coil for detecting a rotation angle and a related method that obviate one or more of the limitations and disadvantages of prior art devices for detecting a rotation angle. The advantages and purposes of the invention will be set forth in part in the description which follows, and in part will be obvious from the description, or may be learned by practice of the invention. The advantages and purposes of the invention will be realized and attained by the elements and combinations particularly pointed out in the appended claims.

To attain the advantages and in accordance with the purposes of the invention, as embodied and broadly described herein, the invention is directed to a device for detecting a rotation angle. The device includes a first coil, a second coil, and a twist prevention mechanism. The first coil detects a coordinate value. The second coil detects the rotation angle. The second coil includes signal lines extending therefrom. The second coil is rotatable around a center of the first coil without rotating the first coil. The twist prevention mechanism prevents the signal lines from twisting.

In another aspect, the invention is directed to a pointer for detecting a rotation angle. The pointer includes a first coil, a second coil, a circuit, and a twist prevention mechanism. The first coil detects a coordinate value of the pointer. The second coil detects the rotation angle. The second coil includes signal lines extending therefrom. The second coil is rotatable around a center of the first coil without rotating the first coil. The circuit is connected to the signal lines. The twist prevention mechanism prevents the signal lines from twisting.

In yet another aspect, the invention is directed to a method for detecting a rotation angle without twisting signal lines. The signal lines include a first and second ends. The method includes the steps of: providing a first coil to detect a coordinate value; connecting a second coil to the first end of the signal lines to detect the rotation angle; connecting a circuit to the second end of the signal lines; rotating the second coil around a center of the first coil without rotating the first coil; and causing the first end of the signal lines to always face the circuit.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DESCRIPTION OF THE PREFERRED EMBODIMENTS

Reference will now be made in detail to the presently preferred embodiment of the present invention, examples of which are illustrated in the accompanying drawings. Wherever possible, the same reference numbers will be used throughout the drawings to refer to the same or like parts. An exemplary embodiment of a pointer utilizing a combined coil device for detecting a rotation angle of the present invention is shown in FIG. 1 and is designated generally by reference number 10.

For purposes of following description, the term "rotation angle" identifies a degree of rotation around a line indicating a direction. For example, a rotation angle perpendicular to a tablet is a degree of rotation around an axis perpendicular to the surface of the tablet. In other words, if the tablet defines the X-Y plane, a rotation angle perpendicular to the tablet is a degree of rotation around the Z axis.

Figure 1:
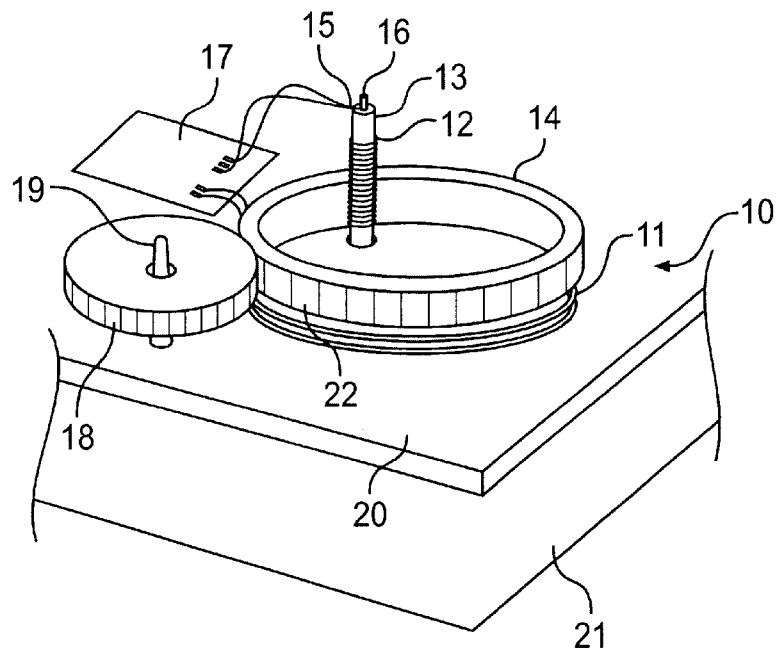
FIG. 1 is a fragmentary perspective view showing a first embodiment of a combined coil and a pointer according to the present invention.
Figure 2:
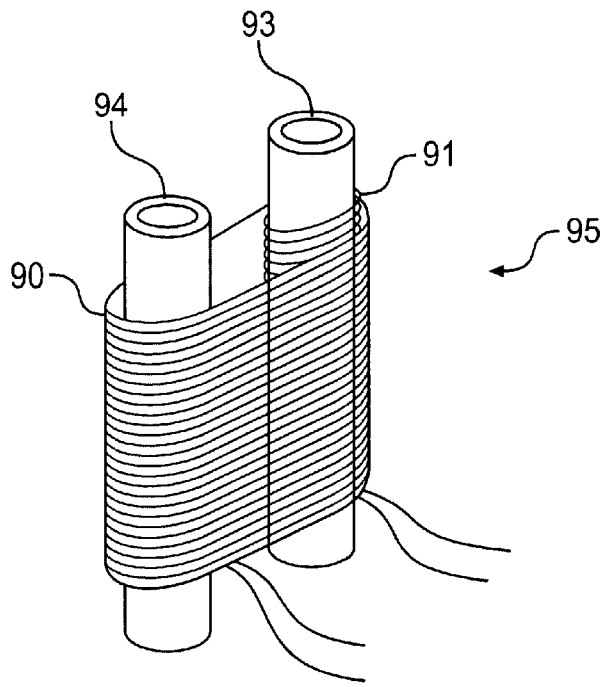
FIG. 2 is a perspective view showing a conventional combined coil in a solid construction.

FIG. 1 shows a pointer 10 that contains a combined coil device. In order to illustrate an inner construction of pointer 10 clearly, only a steel case 20, which is the bottom of pointer 10, is illustrated. The illustration of the other portion (an upper cover) of pointer 10 is omitted.

Pointer 10 operates in conjunction with a tablet 21 to detect the coordinate value of pointer 10. The surface of tablet 21 is generally flat and pointer 10 is laid thereon. As pointer 10 moves around, tablet 21 interacts with pointer 10 to detect the coordinate value of pointer 10. Tablet 21 then inputs the coordinate value in a machine (not shown), such as a computer or the like.

The pointer according to the present invention may be called a cursor or a cordless mouse having a pack-shape. Accordingly, the bottom of pointer 10 for the present invention is generally flat so that it can stay on the surface of tablet 21 without an operator holding it. Steel case 20 illustrates a bottom of such a pack-shaped pointer 10.

For tablet 21 shown in FIG. 1, any conventional tablet that detects the coordinate value of the pointer may be used. However, a tablet employing an electromagnetic induction principle is preferably used. The tablet employing the electromagnetic induction principle detects the coordinate value by sensing the location where a magnetic flux is altered by an interaction between the pointer and tablet.

As illustrated in FIG. 1, pointer 10 contains a combined coil device. The combined coil device includes a coordinate detection coil 11 and a control coil 12. Coordinate detection coil 11 detects the coordinate value of pointer 10 by its interaction with tablet 21. Control coil 12, on the other hand, detects rotation angle of pointer 10 around the center of coordinate detection coil 11.

Coordinate detection coil 11 is a ring-shaped (round-shaped) coil fixed on steel case 20. The ring-shaped coil is a vacant core coil (a coil without a magnetic core). Preferably, coordinate detection coil 11 is wound a plurality of times to generate a magnetic flux of necessary strength. The magnetic flux generated by coordinate detection coil 11 interacts with tablet 21 to detect the coordinate value of pointer 10. Coordinate detection coil 11 forms a round shape, and thereby achieves rotational symmetry around its center. Consequently, the magnetic flux generated by the alternate current in coordinate detection coil 11 also achieves rotational symmetry around its center.

Control coil 12 is provided on a rotation disk 14 so that its center remains stationary relative to rotation disk 14. On the other hand, rotation disk 14 is rotatable on steel case 20 about its center. The center of rotation disk 14 is identical with the center of coordinate detection coil 11. The center of control coil 12, however, is spaced apart from the center of coordinate detection coil 11. As a result, control coil 12 and its center are rotatable around the center of coordinate detection coil 11 as rotation disk 14 rotates. Consequently, control coil 12 assumes different rotation angles around the center of coordinate detection coil 11 as rotation disk 14 rotates.

Rotation disk 14 is coupled to an operating member 18 through a rotational movement transmitter 22 (e.g., gear teeth). Thus, rotation disk 14 rotates as operating member 18 rotates about its shaft 19. At least a portion of operating member 18 is exposed outside pointer 10 so that it can be rotated by operator's finger. Preferably, operating member 18 is a wheel at least a portion of which is exposed outside pointer 10 to be rotated by operator's thumb.

The combined coil device includes a twist prevention mechanism to prevent signal lines 15 from twisting as control coil 12 and its center rotate around the center of coordinate detection coil 11. One end of signal lines 15 either extends from or is connected to control coil 12. The other end of signal lines 15 is connected a control circuit 17 that remains stationary within pointer 10. Control circuit 17 comprises a circuit including a print substrate fixed on steel case 20.

The twist prevention mechanism includes a free rotating member 13 provided on rotation disk 14. In FIG. 1, the free rotating member is a cylindrical ferrite (material for a magnetic core) core 13 around which control coil 12 is wound a plurality of times. Cylindrical ferrite core 13 is disposed around a shaft 16 and is freely rotatable about shaft 16. Shaft 16, on the other hand, is fixed on rotation disk 14 and is spaced apart from the center of rotation disk 14. As a result, control coil 12 and its center rotate around the center of the rotation disk 14 as rotation disk 14 rotates. At the same time, cylindrical ferrite core 13, and therefore control coil 12, can rotate freely about shaft 16.

Signal lines 15 are relatively rigid so that they cause cylindrical ferrite core 13 to rotate about shaft 16 as rotation disk 14 rotates. Consequently, the root of signal lines 15 (the portion extending from or connected to control coil 12) always faces control circuit 17 as control coil 12 and its center rotate around the center of rotation disk 14. Thus, signal lines 15 do not twist or disconnect from control circuit 17. Without a free rotating cylindrical ferrite core 13, signal lines 15 will twist and may eventually disconnect from control circuit 17 as control coil 12 rotates around the center of rotation disk 14.

Signal lines 15 are long enough so that they do not disconnect from control circuit 17 as control coil 12 rotates around the center of rotation disk 14. However, signal lines 15 maintain the required rigidity to rotate cylindrical ferrite core 13. Furthermore, by extending signal lines 15 from its upper portion, cylindrical ferrite core 13 maintains signal lines 15 unobstructed by other components (e.g. shaft 19) in pointer 10.

According to the embodiment of the present invention shown in FIG. 1, signal lines 15 neither twist nor disconnect regardless of the rotational directions and degrees of control coil 12. Because of cylindrical ferrite core 13 that is freely rotatable about shaft 16, the root of signal lines 15 always faces control circuit 17. Signal lines 15 are sufficiently long to avoid the disconnection but rigid enough to rotate cylindrical ferrite core 13. Cylindrical ferrite core 13, at the upper portion of which signal lines 15 are fixed, maintains signal lines 15 unobstructed by other components in pointer 10 as control coil 12 rotates around the center of coordinate detection coil 11.

Because the details of control circuit 17 is well known in the art, as evidenced by U.S. Pat. No. 5,644,108, only a brief explanation follows. Control circuit 17 may open or short-circuit signal lines 15. When control circuit 17 opens signal lines 15, no induced current runs through control coil 12 and the coordinate value detected on tablet 21 corresponds to the center of coordinate detection coil 11. However, when control circuit 17 short-circuits signal lines 15, induced current runs through control coil 12. This induced current makes it difficult for the magnetic flux generated by coordinate detection coil 11 to pass through control coil 12. Consequently, the magnetic flux tends to converge far from control coil 12. Therefore, the coordinate value detected in the tablet 21 moves to the direction far from control coil 12 on the line connecting the center of coordinate detection coil 11 and the center of control coil 12. From this coordinate movement, the location, and therefore the rotation angle, of control coil 12 can be determined.

Figure 3:
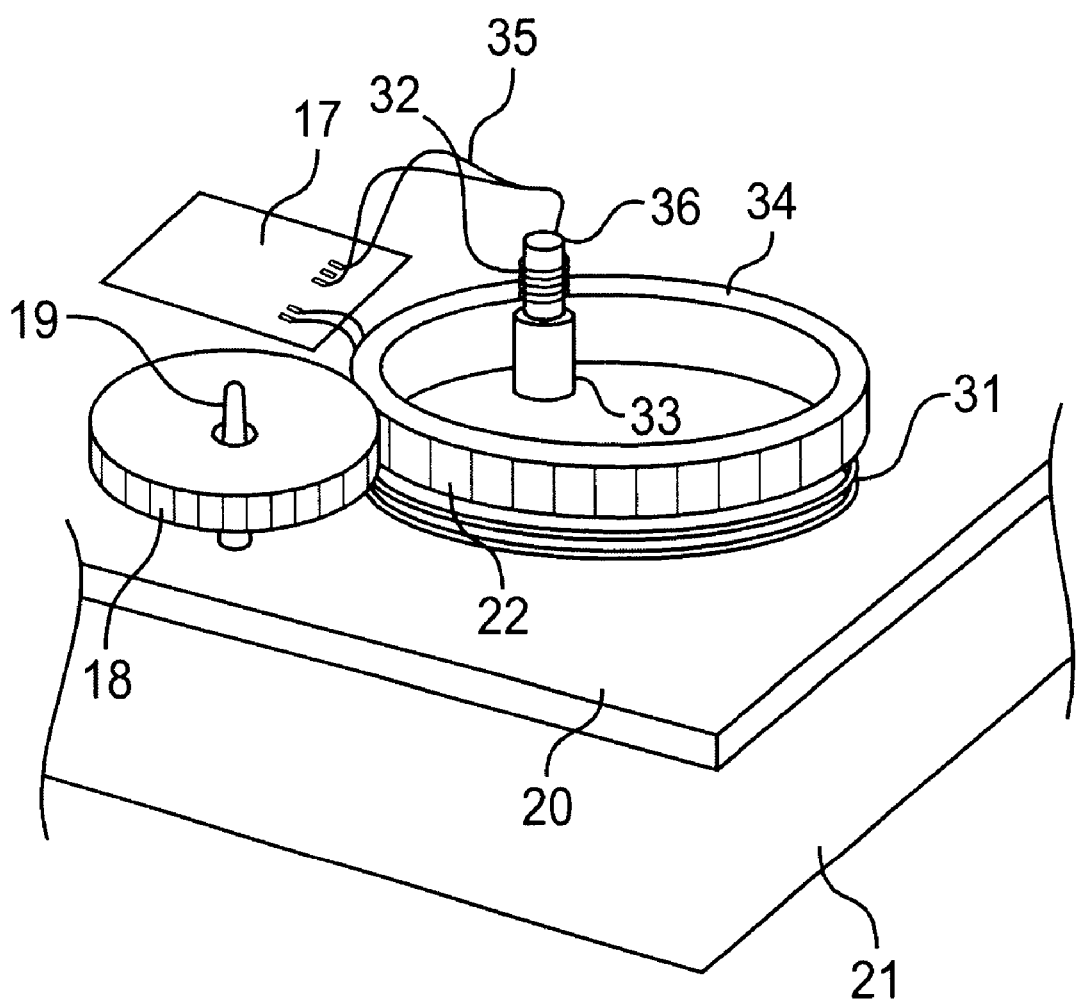
FIG. 3 is a fragmentary perspective view showing a second embodiment of a combined coil and a pointer according to the present invention illustrating a control coil employing a bar-shaped core.

FIG. 3 shows another embodiment of the present invention. In the embodiment shown in FIG. 3, a control coil 32 is wound around a bar-shaped ferrite core 36. Bar-shaped ferrite core 36 either includes a bearing 33 or is coupled to bearing 33. Bearing 33 is fixed on rotation disk 34 with its center spaced apart from the center of rotation disk 34. Bearing 33, however, is freely rotatable about its center. As a result, control coil 32 rotates in the same manner as the control coil 12 shown in embodiment of FIG. 1. That is, as control coil 32 and its center rotate around the center of the rotation disk 34, control coil 32 can freely rotate about the center of bearing 33 because bearing 33 is freely rotatable about it center. The other features of this embodiment are the same as those shown in FIG. 1.

Figure 4:
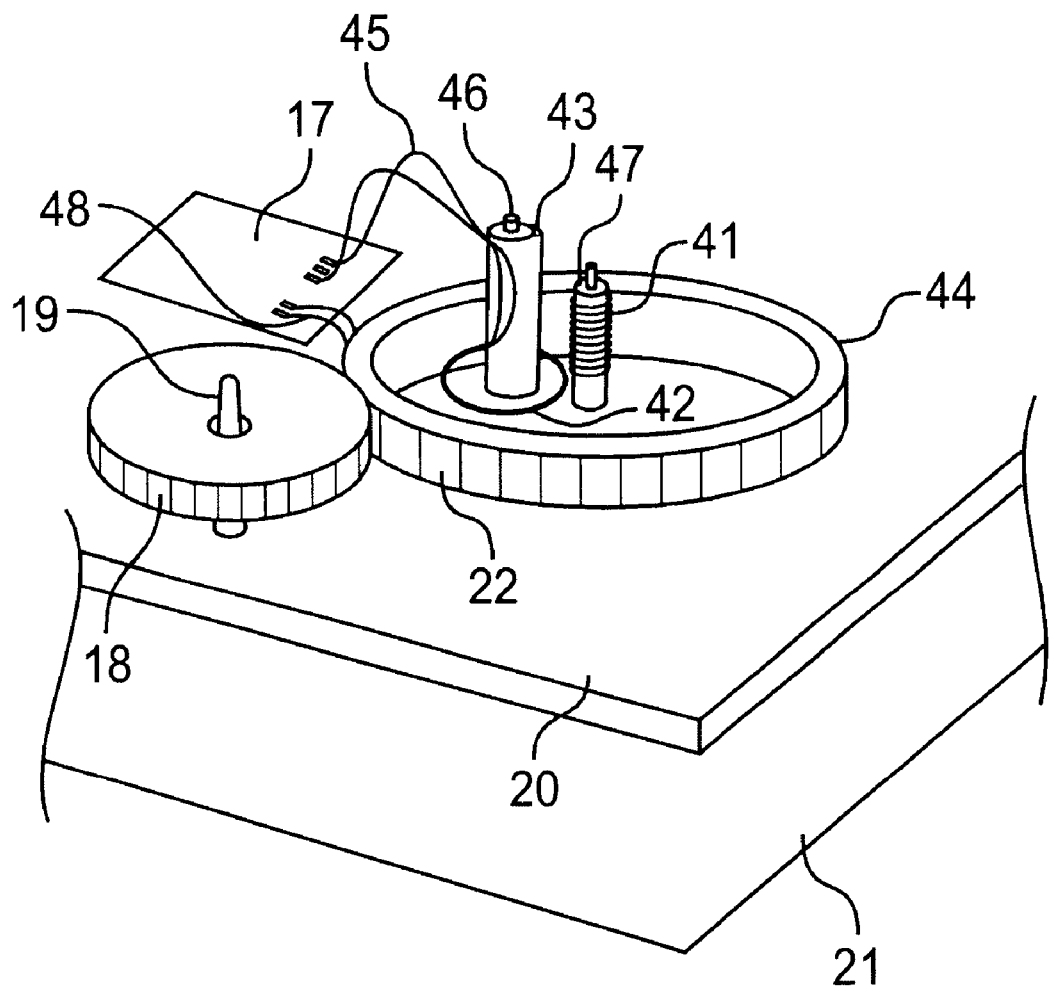
FIG. 4 is a fragmentary perspective view showing a third embodiment of a combined coil and a pointer according to the present invention illustrating a coordinate detection coil with a core and a control coil with a vacant core.

FIG. 4 shows yet another embodiment of the present invention. In the embodiment shown in FIG. 4, a coordinate detection coil 41 is wound around a ferrite core 47 that is fixed on steel case 20. Signal lines 48 extending from coordinate detection coil 41 are lined along the steel case 20. A rotation disk 44 comprises a doughnut-shaped disk with a hollow center portion where ferrite core 47 is disposed.

In the embodiment shown in FIG. 4, a control coil 42 is provided on rotation disk 44. Control coil 42 is a ring-shaped vacant core (without a magnetic core) with its center spaced apart from the center of rotation disk 44. Signal lines 45 extending from control coil 42 are fixed on the upper portion of a cylindrical member 43. Cylindrical member 43 is disposed around a shaft 46 that is fixed on rotation disk 44 at the center of control coil 42. Because cylindrical member 43 is freely rotatable about shaft 46, signal lines 45 can freely rotate about shaft 46. Thus, the root of signal lines 45 always faces control circuit 17 as control coil 42 and its center rotates around the center of rotation disk 44. As previously mentioned with regard to the embodiment shown in FIG. 1, signal lines 45 are sufficiently rigid to cause cylindrical member 43 to rotate freely about shaft 46 and are sufficiently long to allow control coil 42 and its center to rotate around the center of rotation disk 44.

Figure 5:
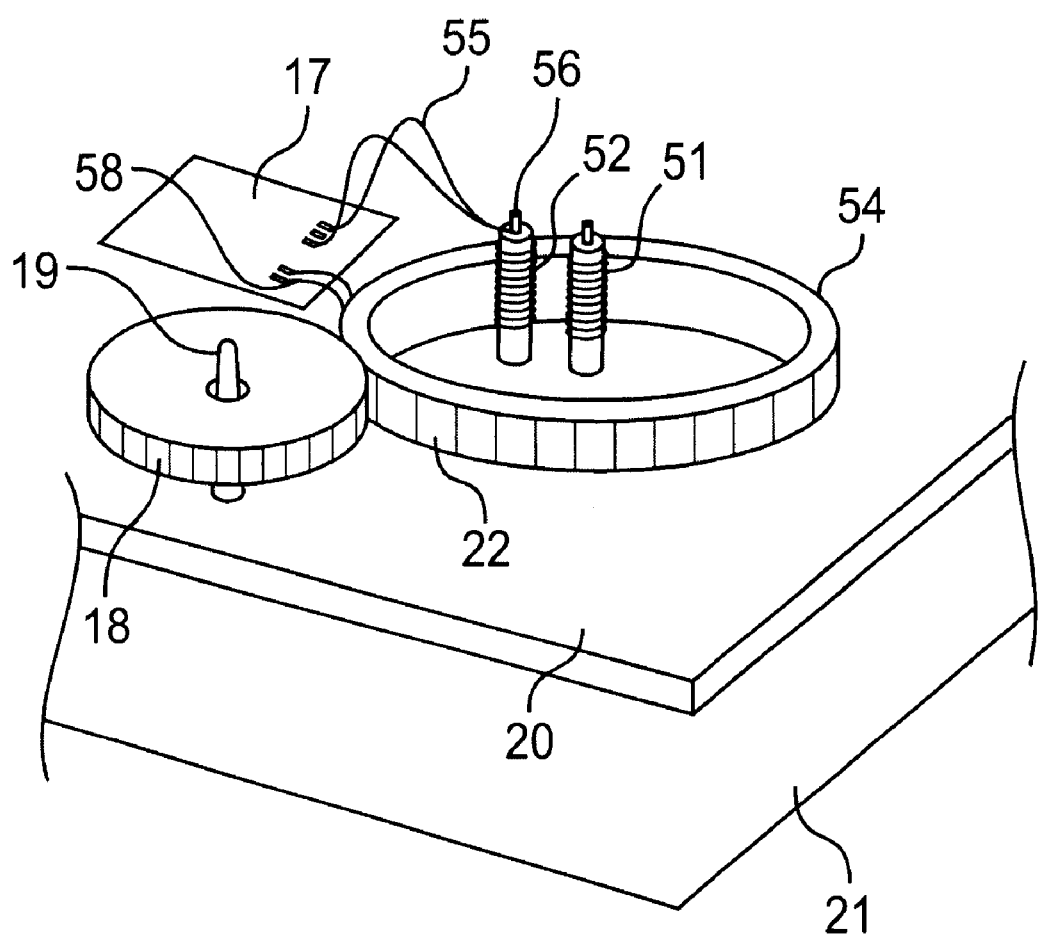
FIG. 5 is a fragmentary perspective view showing a fourth embodiment of a combined coil and a pointer according to the present invention illustrating both a coordinate detection coil and a control coil with cores.

FIG. 5 shows yet another embodiment of the present invention. In the embodiment shown in FIG. 5, both a coordinate detection coil 51 and a control coil 52 are wound around ferrite cores. Like rotation disk 44 shown in FIG. 4, a rotation disk 54 in this embodiment is a donut-shaped disk with a hollow center portion where the ferrite core of coordinate detection coil 51 is disposed. Signal lines 58 extending from coordinate detection coil 51 are lined along steel case 20 to control circuit 17. Like control coil 12 shown in FIG. 1, control coil 52 in this embodiment can rotate freely about a shaft 56. Thus, as previously mentioned, the root of signal lines 55 always faces control circuit 17.

Figure 6:
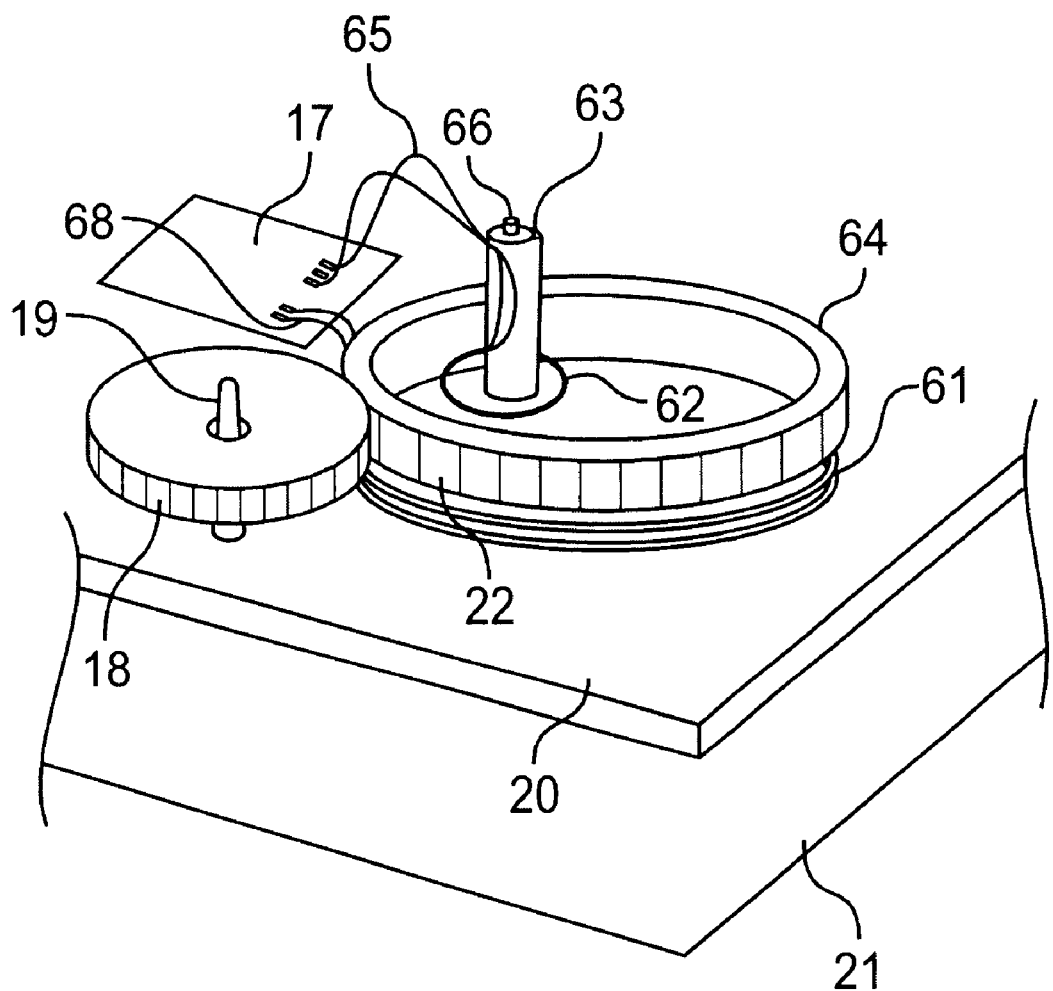
FIG. 6 is a fragmentary perspective view showing a fifth embodiment of a combined coil and a pointer according to the present invention illustrating both a coordinate detection coil and a control coil with vacant cores.

FIG. 6 shows yet another embodiment of the present invention. In the embodiment shown in FIG. 6, both a coordinate detection coil 61 and a control coil 62 have no magnetic cores (vacant cores). Signal lines 68 extending from coordinate detection coil 61 are lined along steel case 20 to control circuit 17. Like signal lines 45 shown in FIG. 4, signal lines 65 extending from control coil 62 are fixed on the upper portion of a cylindrical member 63. Cylindrical member 63 is freely rotatable about shaft 66 so that the root of signal lines 65 always faces control circuit 17. Cylindrical member 63, therefore, prevents signal lines 65 from twisting as control coil 62 and its center rotate around the center of rotation disk 64.

It will be apparent to those skilled in the art that various modifications and variations can be made in the assembly of the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A device for detecting a rotation angle comprising:
   a first coil to detect a coordinate value;
   a second coil to detect the rotation angle, the second coil having signal lines extending therefrom and rotatable around a center of the first coil without rotating the first coil; and
   a twist prevention mechanism to prevent the signal lines from twisting.

2. The device of claim 1, wherein the second coil is provided on a rotatable member.

3. The device of claim 2, wherein the twist prevention mechanism maintains the signal lines unobstructed as the rotatable member rotates.

4. The device of claim 3, wherein the twist prevention mechanism includes a free rotating member to which the signal lines are fixed.

5. The device of claim 4, wherein the second coil is a vacant coil disposed on a surface of the rotatable member.

6. The device of claim 5, wherein the second coil is disposed within the first coil.

7. The device of claim 4, wherein the second coil is wound around the free rotating member.

8. The device of claim 7, wherein the second coil is disposed within the first coil.

9. The device of claim 8, wherein the free rotating member includes a bearing.

10. The device of claim 2, further comprising an operating member to rotate the rotatable member, at least a portion of the operating member being exposed outside the device.

11. The device of claim 10, wherein the operating member is a wheel adapted to be operated by operator's finger.

12. The device of claim 1, wherein the signal lines are connected to a stationary circuit.

13. A pointer for detecting a rotation angle, comprising:
a first coil to detect a coordinate value of the pointer;
a second coil to detect the rotation angle, the second coil having signal lines extending therefrom and rotatable around a center of the first coil without rotating the first coil;
a circuit connected to the signal lines; and
a twist prevention mechanism to prevent the signal lines from being twisted.

14. The pointer of claim 13, wherein the second coil is provided on a rotatable member.

15. The pointer of claim 14, wherein the twist prevention mechanism maintains the signal lines unobstructed as the rotatable member rotates.

16. The pointer of claim 15, wherein the twist prevention mechanism includes a free rotating member to which the signal lines are fixed.

17. The pointer of claim 16, wherein the second coil is a vacant coil disposed on a surface of the rotatable member.

18. The pointer of claim 17, wherein the second coil is disposed within the first coil.

19. The pointer of claim 16, wherein the second coil is wound around the free rotating member.

20. The pointer of claim 19, wherein the second coil is disposed within the first coil.

21. The pointer of claim 20, wherein the free rotating member includes a bearing.

22. The pointer of claim 14, further comprising an operating member to rotate the rotatable member, at least a portion of the operating member being exposed outside the pointer.

23. The pointer of claim 22, wherein the operating member is a wheel adapted to be operated by operator's finger.

24. The pointer of claim 13, wherein the circuit remains stationary in the pointer.

25. A method for detecting a rotation angle without twisting signal lines, the signal lines having a first and second end, comprising the steps of:
providing a first coil to detect a coordinate value;
connecting a second coil to the first end of the signal lines to detect the rotation angle;
connecting a circuit to the second end of the signal lines;
rotating the second coil around a center of the first coil without rotating the first coil; and
causing the first end of the signal lines to always face the circuit.

26. The method of claim 25, further comprising the step of connecting the first end of the signal lines to a free rotating member.

27. The method of claim 26, further comprising the step of winding the second coil around the free rotating member.

28. The method of claim 27, further comprising the step of locating the second coil within the first coil.

29. The method of claim 26, further comprising the step of fixing the first end of the signal lines at an upper portion of the free rotation member.

* * * * *